United States Patent
Ostwald

[15] 3,657,887
[45] Apr. 25, 1972

[54] POWER ASSISTED BRAKE
[72] Inventor: Fritz Ostwald, Buchschlag, Germany
[73] Assignee: International Telephone and Telegraph Corporation, New York, N.Y.
[22] Filed: Feb. 25, 1970
[21] Appl. No.: 14,048

[30] Foreign Application Priority Data
Mar. 1, 1969 Germany..................P 19 10 600.4

[52] U.S. Cl.............................................60/54.6 P
[51] Int. Cl.............................................F15b 7/00
[58] Field of Search..............................60/54.6, 5 P

[56] References Cited
UNITED STATES PATENTS
2,410,269 10/1946 Chouings.........................60/54.6 P
2,544,042 3/1951 Pontius............................60/54.6 P Primary Examiner—Edgar W. Geoghegan
Assistant Examiner—A. M. Zupcic
Attorney—C. Cornell Remsen, Jr., Walter J. Baum and Paul W. Hemminger

[57] ABSTRACT

A hydraulic brake system with a booster for assisting the brake actuating force, the booster control valve being a slide valve mounted in a central bore in the actuating piston and connecting a pressure accumulator to a pressure chamber behind the piston when a slide, which is also mounted in the bore in the piston, opens the valve upon actuation of the brakes.

1 Claims, 2 Drawing Figures

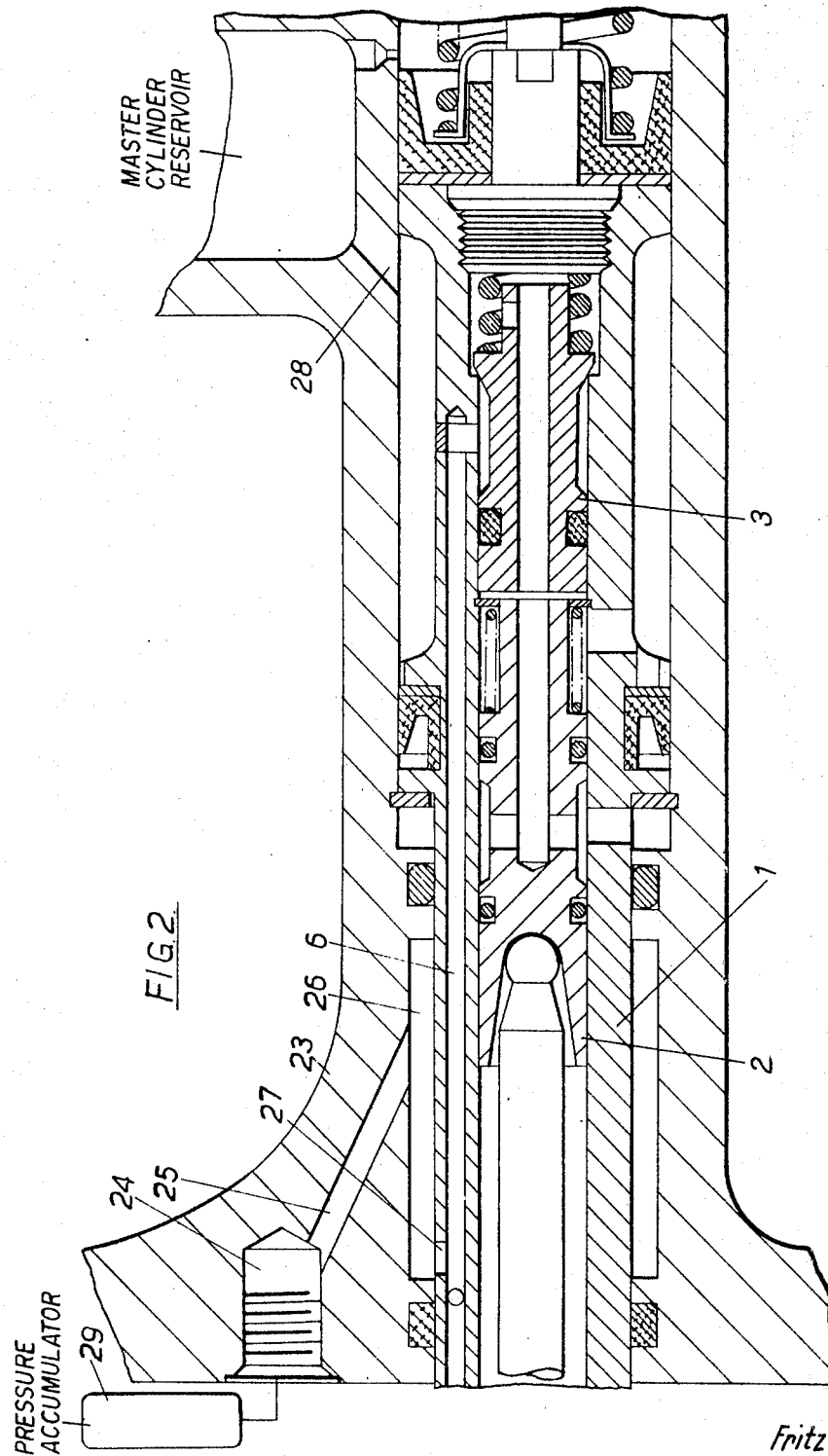

POWER ASSISTED BRAKE

BACKGROUND OF THE INVENTION

1. Field of the Invention

This invention relates to hydraulic brake systems with a booster for assisting the brake actuating force and particularly to brake systems of this type in which a valve in the master cylinder connects a pressure accumulator to a pressure chamber behind the master cylinder piston when the brakes are applied to boost the brake actuating force.

2. Description of Prior Art

German Pat. No. 1 226 444 discloses a brake booster system which uses an accumulator and a booster pump. A hollow actuating piston is disposed in the master cylinder, the latter consisting of an operating piston and a control member. The hollow actuating piston is displaced by external force until the front of the hollow actuating piston, after having overcome a certain clearance, abuts against a valve seat on a bushing inserted in the operating piston. Pressure medium flow from a booster pump through the master cylinder to a reservoir is thereby interrupted and the pressure medium conveyed by the pump is applied to the annular surface of the actuating piston as well as to the effective surface of the operating piston. A pin which is rigidly fixed to the operating piston extends with wide clearance into the inner bore of the actuating piston and actuates a lever when the piston is displaced to move a rocker-arm bracket with a push rod mounted thereon, which, after overcoming a certain clearance, opens a check valve in the line leading to the pressure accumulator. Since this high-pressure line communicates with the pressure medium flow via a longitudinal bore in the housing of the control member, the actuating piston and the operating piston will be acted upon by the accumulator pressure after the check valve is open.

German Pat. No. 1 232 827 discloses a brake booster which is completely separated from the master cylinder. A first hydraulic power source is permanently connected to a chamber in the booster control communicating with the master cylinder. In the rest position the chamber is also connected to the reservoir via a bore in the booster control valve body, the latter being accommodated in a bushing. The feed line of a pressure accumulator terminates in the annular chamber in the bushing, the chamber being closed towards the master cylinder by means of the seat valve. Upon actuation of the system an opening provided in the actuating member caps the cylindrical end of the valve body and thus interrupts the pressure medium flow to the reservoir so that the full pressure exerted by the first pressure medium source is applied to the master cylinder piston. Upon further displacement of the actuating member the spring-loaded valve body is lifted from its seat thereby providing a connection between the pressure accumulator and the master cylinder.

The arrangement of the power cylinder unit and the pressure control unit, either axially one after the other as in German Pat. No. 1 226 444, or in completely separate housings as in German Pat. No. 1 232 827, requires an undesirably large amount of space. In addition, a number of movable seals permanently subject to the accumulator pressure are necessary and this reduces the sensitivity of the system's response.

SUMMARY OF THE INVENTION

An object of this invention is to provide a master cylinder and brake booster which requires less space than prior art devices.

Another object of this invention is to provide a compact master cylinder which requires less seals, particularly such seals which are subject to the accumulator pressure than the prior art devices, whereby the sensitivity of system response is increased.

These objects are achieved by providing a master cylinder with a hollow actuating piston into which the entire auxiliary pressure control is fitted.

In the embodiments shown in the accompanying drawings a passage in the body of the hollow operating piston has one end permanently connected to the accumulator and the other end connected to a spring-loaded slide valve leading to the inner bore of the piston which communicates with the actuating chamber for the piston. An actuating member within the piston closes a connection between the reservoir and the actuating chamber and opens the slide valve when the brakes are applied.

The accumulator is connected to the passage in the piston either by a flexible hose or an axially extending annular supply chamber in the housing.

BRIEF DESCRIPTION OF THE DRAWINGS

FIG. 2 is a partial sectional view of a hydraulic brake master cylinder and booster control showing another embodiment of the invention.

DESCRIPTION OF THE PREFERRED EMBODIMENTS

Figure 1:
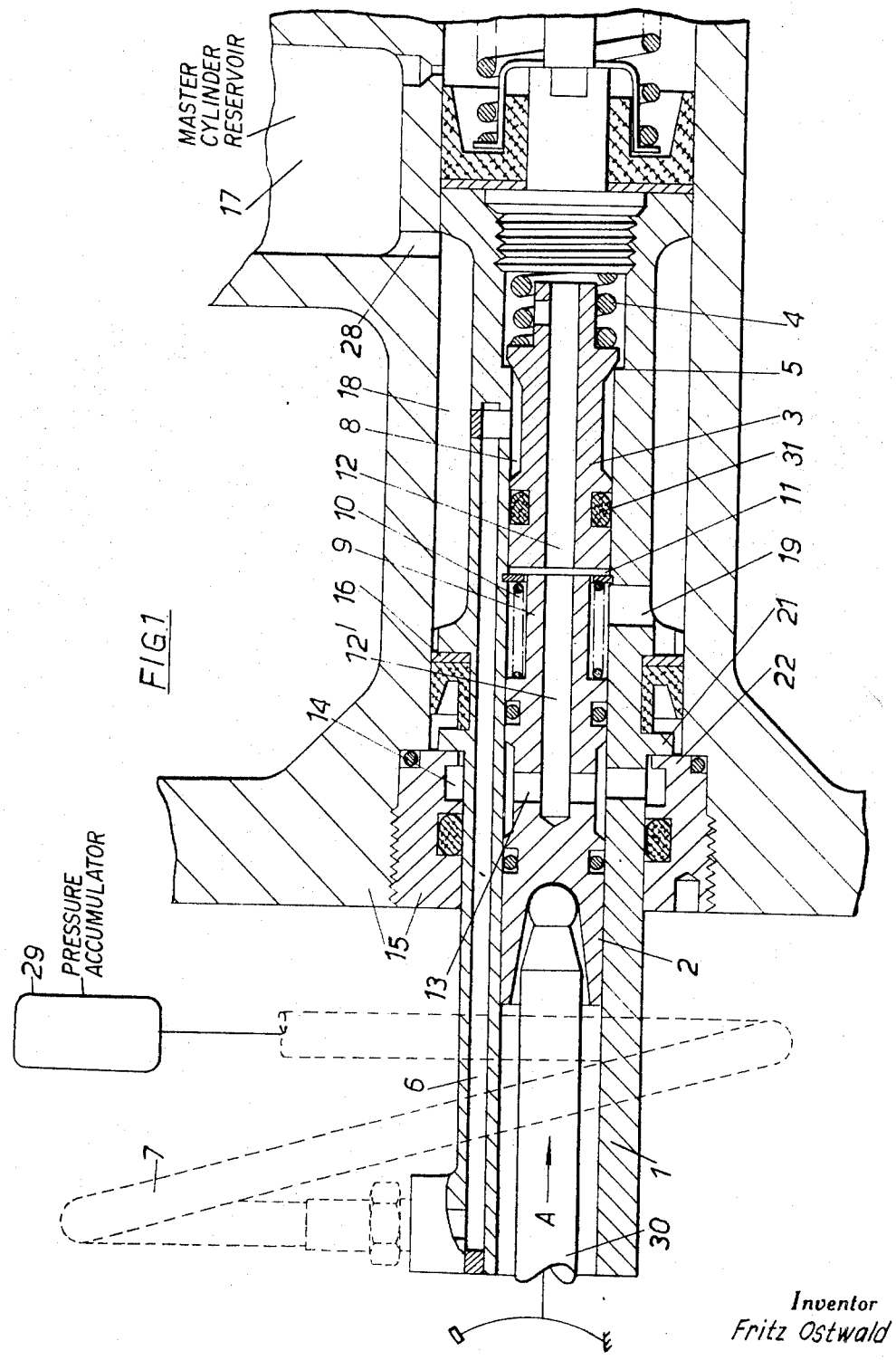
FIG. 1 is a partial sectional view of a hydraulic brake master cylinder and booster control embodying the present invention.

Referring now to FIG. 1 there is shown a master cylinder 15 having an operating piston 1. A slide 2 and a valve member 3 are slidably arranged in a central bore in the operating piston. The valve member 3, which can be opened by the slide 2, is held against a valve seat 5 in the piston by a spring 4. A flexible hose 7 having one end connected to a pressure accumulator 29 supplies hydraulic fluid to an annular chamber 8 in the valve member 3 via a passageway 6 in the piston 1.

The slide 2 has a stepped end 9 which lifts the valve 3 from its seat when the brakes are actuated by the movement of the slide in the direction A shown in the drawing. In the unbraked condition, the slide 2 is held in the position shown in FIG. 1 by means of a spring 10 which bears against the step in the slide and an abutment provided in the inner bore of the piston. A clearance 11 exists between end 9 of the slide and the valve member 3 in the unbraked condition. An annular pressure chamber 14 between the master cylinder 15 and piston 1 is connected to the longitudinal bore 12' in the slide 2 by openings 13. A longitudinal bore 12 in the valve member 3 continues the bore 12' and connects with the downstream side of the valve 3. Abutments 21 and 22 provided on the piston wall and the cylinder wall in the annular chamber 14 limit the movement of the piston 1. The annular surface 16 of the stepped piston forms the surface to which the auxiliary pressure is applied and is sealed towards the piston and the cylinder wall by means of a gasket. In the position shown the master cylinder reservoir 17 is connected to annular chamber 14 via bore 28, annular chamber 18, transverse bore 19 in the piston 1, clearance 11, longitudinal bore 12' and holes 13.

The invention operates as follows: in the initial position of the piston and the slide as shown in FIG. 1, the reservoir is connected to the pressure chamber 14 while the valve member 3 is kept in closed position against the seat 5 by the spring 4. If the piston is to be moved in the direction of actuation, i.e., in the direction A, the slide 2 has to be moved in the same direction by external force on the push rod 30. Thereby the connection between the reservoir 17 and the annular chamber 14 through the concentric bore 12' of the slide is closed as the annular face of the slide end 9 engages the opposed surface of the seat valve 3 to eliminate the clearance 11. Upon further movement of the slide 2, the valve 3 is lifted from its seat 5 thereby opening the passage from the channel 6 into the inner bore of the piston. The pressure medium then flows from the accumulator through the channel 6 and the open valve 3 into the inner bore of the hollow piston 1 and is applied to the bottom surface of the piston 1 which is displaced as a consequence thereof. This causes the abutment 21 of the piston 1 to be lifted from the abutment 22 of the inner cylinder wall, thus enabling the pressure medium to flow through the bores 12, 12' and 13 into the enlarged annular chamber 14 and to act against the annular surface 16 of the piston, the annular surface being fitted with a gasket. As is well known, a reaction force arises at the surface of the seat valve. Hence, the power transmission is dependent of the ratio between the seat valve surface and the effective surface 16. If the slide 2 moves in the opposite direction thereby restoring the connection between the annular chamber 14 and the reservoir 17 via the slot located between the slide end 9 and the seat valve 3, this will cause the pressure in the annular chamber 14 to reduce, and the stepped piston will return to its initial position by spring action.

Besides the compact construction which this invention provides, it is a special advantage of the invention that seals can be omitted which are otherwise permanently or continuously exposed to the high accumulator pressure in the actuated and unactuated position of slide 2 and reduce the sensitivity of response of the unit. In the illustration shown in FIG. 1 the only seal that is exposed continuously to high accumulator pressure is seal 31.

The embodiment of the invention shown in FIG. 2, which is the same as that shown in FIG. 1 except as described hereinbelow, eliminates the necessity of the flexible hose 7 between the accumulator and the passage 6. An inlet 24 which is connected to an accumulator 29 communicates with an axially extending annular chamber 26 formed between the cylinder 23 and the piston 1 via bore 25. An opening 27 in the piston wall connects the chamber 26 to the channel 6. In this case a seal between the cylinder and piston must be provided on either side of the annular chamber 26.

It will be appreciated that the invention illustrated and described herein may be modified by those skilled in the art without deviating from the spirit and scope of the invention as set forth in the following claims.

I claim as my invention:

1. A power assisted hydraulic brake comprising:

a reservoir;

a pressure accumulator;

a hollow cylindrical housing having a longitudinal axis;

an operating piston disposed coaxially of said longitudinal axis in sliding engagement with said housing and extending from a first point outside said cylindrical housing to a second point inside said cylindrical housing, said piston including a first bore disposed coaxially of said longitudinal axis, a longitudinal passage disposed wholly within said piston extending from a third point adjacent said first point to a fourth point adjacent said second point and being radially spaced from said longitudinal axis and said first bore, an annular surface extending outwardly from the outer surface of said piston intermediate said first and second points to which pressure is applied from said accumulator and a valve seat formed on the inner surface of said first bore adjacent said fourth point;

a movable actuating slide disposed coaxially of said longitudinal axis and in sliding engagement with the inner surface of said first bore, said slide having an actuating surface, a second bore disposed coaxially of said longitudinal axis being open at one end thereof and closed at the other end thereof adjacent said actuating surface and a transverse passage through the wall of said slide adjacent said actuating surface for communication between said second bore and said annular surface;

a movable valve member disposed coaxially of said longitudinal axis and in sliding engagement with the inner surface of said first bore, said valve member having one end thereof adjacent said one end of said slide normally spaced from said one end of said slide to provide a clearance passage, a valve closing element disposed on the other end of said valve member to normally seat on said valve seat and a third bore disposed coaxially of said longitudinal axis and extending completely through said valve member in communication with said second bore;

a first chamber disposed between the outer surface of said valve member and the inner surface of said piston in communication with said longitudinal passage adjacent said second point and said valve seat;

a second chamber disposed between the inner surface of said housing and the outer surface of said piston in communication with said reservoir and said clearance passage;

a flexible hose connected between said accumulator and said longitudinal passage adjacent said third point;

means to actuate said slide to close said clearance passage to interrupt fluid flow to said reservoir from said annular surface through said transverse passage, said second bore, said clearance passage and said second chamber and to move said valve member to unseat said valve closing member to permit said accumulator to communicate with said annular surface through said longitudinal passage, said first chamber, said valve seat, said second and third bore and said transverse passage; and only a single seal subjected continuously to the pressure of said accumulator during both the actuated and unactuated position of said slide, said seal being disposed between the outer surface of said valve member and the inner surface of said first bore intermediate said first chamber and said clearance passage.

* * * * *